United States Patent
Oda et al.

(10) Patent No.: US 6,522,667 B1
(45) Date of Patent: Feb. 18, 2003

(54) NETWORK INTERWORKING DEVICE FOR IP NETWORK / ATM NETWORK

(75) Inventors: Toshikane Oda, Tokyo (JP); Hideaki Yamada, Tokyo (JP)

(73) Assignee: KDD Corporation, Tokyo (JP)

( * ) Notice: Subject to any disclaimer, the term of this patent is extended or adjusted under 35 U.S.C. 154(b) by 0 days.

(21) Appl. No.: 09/311,355

(22) Filed: May 13, 1999

(30) Foreign Application Priority Data

May 14, 1998  (JP) ............................................. 10-148292

(51) Int. Cl.[7] .............................................. H04L 12/25
(52) U.S. Cl. ................................. 370/474; 370/395.52
(58) Field of Search ............................... 370/474, 365, 370/366, 352, 353, 354, 395.1, 395.6, 395.52

(56) References Cited

U.S. PATENT DOCUMENTS

| | | | | |
|---|---|---|---|---|
| 5,623,605 A | * | 4/1997 | Keshav et al. | |
| 5,802,050 A | * | 9/1998 | Petersen et al. | 370/394 |
| 5,812,552 A | * | 9/1998 | Arora et al. | 370/401 |
| 6,147,999 A | * | 11/2000 | Honda et al. | 370/396 |
| 6,188,689 B1 | * | 2/2001 | Katsube et al. | 370/389 |
| 6,222,839 B1 | * | 4/2001 | Nakazaki et al. | 370/352 |
| 6,381,244 B1 | * | 4/2002 | Nishimura et al. | 370/395.21 |
| 6,385,193 B1 | * | 5/2002 | Civanlar et al. | 370/352 |

\* cited by examiner

*Primary Examiner*—Ken Vanderpuye
(74) *Attorney, Agent, or Firm*—Arent Fox Kinter Plotkin & Kahn, PLLC

(57) ABSTRACT

A network interworking device for executing conversion between IP packets and ATM cells, the network interworking device being to be connected between an IP network in which information are transmitted in a form of the IP packets and an ATM network in which information are transmitted in a form of the ATM cells, the IP network having a hierarchy structure with an IP layer, the ATM network having a hierarchy structure with an AAL layer, the network interworking device comprising means for assembling a plurality of ATM cells in the ALL layer of the ATM network into an IP packet when the plurality of the ATM cells are to be transmitted to the same address in the IP communication network, the assembled IP packet being transmitted to the IP layer, and means for disassembling an IP packet in the IP layer of the IP network into a plurality of ATM cells, the disassembled ATM cells being transmitted to the AAL layer.

4 Claims, 6 Drawing Sheets

NETWORK INTERWORKING DEVICE FOR IP NETWORK / ATM NETWORK

FIELD OF THE INVENTION

The present invention relates to a network interworking device to be connected between an IP (Internet Protocol) network in which signal are transmitted in a form of IP packets and an ATM (Asynchronous Transfer Mode) network in which signals are transmitted in a form of ATM cells.

DESCRIPTION OF THE RELATED ART

Such a network interworking device called as gateway is typically utilized in for example in internet telephone system, and converts an IP packet used in the IP network into ATM cells used in the ATM network and vice versa.

In the conventional internet interworking device, data conversion has been executed at the highest of the respective protocols. In other words, assembling of ATM cells and disassembling of IP packet have been carried out at user data level.

Such data conversion at the highest layers may result excess overhead or waste because all data conversion processes are not necessary to do at the highest layers.

For example, when audio coding data is transferred, since the audio coding standard is defined uniquely in each network, the audio data received from the ATM network is decoded into pulse code modulation data at the highest layer, and then the decoded data is coded into the audio data to be transmitted to the IP network. Accordingly, wasteful processes are executed when the audio coding standard is the same in both networks. Furthermore, the audio quality will deteriorate at each time the data passes through the network interworking device.

SUMMARY OF THE INVENTION

It is therefore an object of the present invention to provide a network interworking device to be connected between an IP network and an ATM network, whereby excess overhead in conversion between an IP packet and ATM cells can be decreased.

According to the present invention, a network interworking device for executing conversion between IP packets and ATM cells comprises, means for assembling a plurality of ATM cells in the ALL layer of said second comunication network into an IP packet when the plurality of the ATM cells are to be transmitted to the same address in said first communication network, said assembled IP packet being transmitted to said IP layer, and means for disassembling an IP packet in the IP layer of said first communication network into a plurality of ATM cells, said disassembled ATM cells being transmitted to said AAL layer.

It is also preferred that each of said ATM cells is an ATM short cell, and wherein an IP address of said IP packet corresponds to a channel identifier CID of said ATM short cell.

It is also preferred that the AAL layer is an AAL type-2 layer.

It is also preferred that when audio coding data is transferred, said audio coding data is converted between an IP packet and ATM cells with each other, without converting via the pulse coded modulation.

Further objects and advantages of the present invention will be apparent from the following description of the preferred embodiments of the invention as illustrated in the accompanying drawings.

DESCRIPTION OF THE PREFERRED EMBODIMENTS

Figure 1:
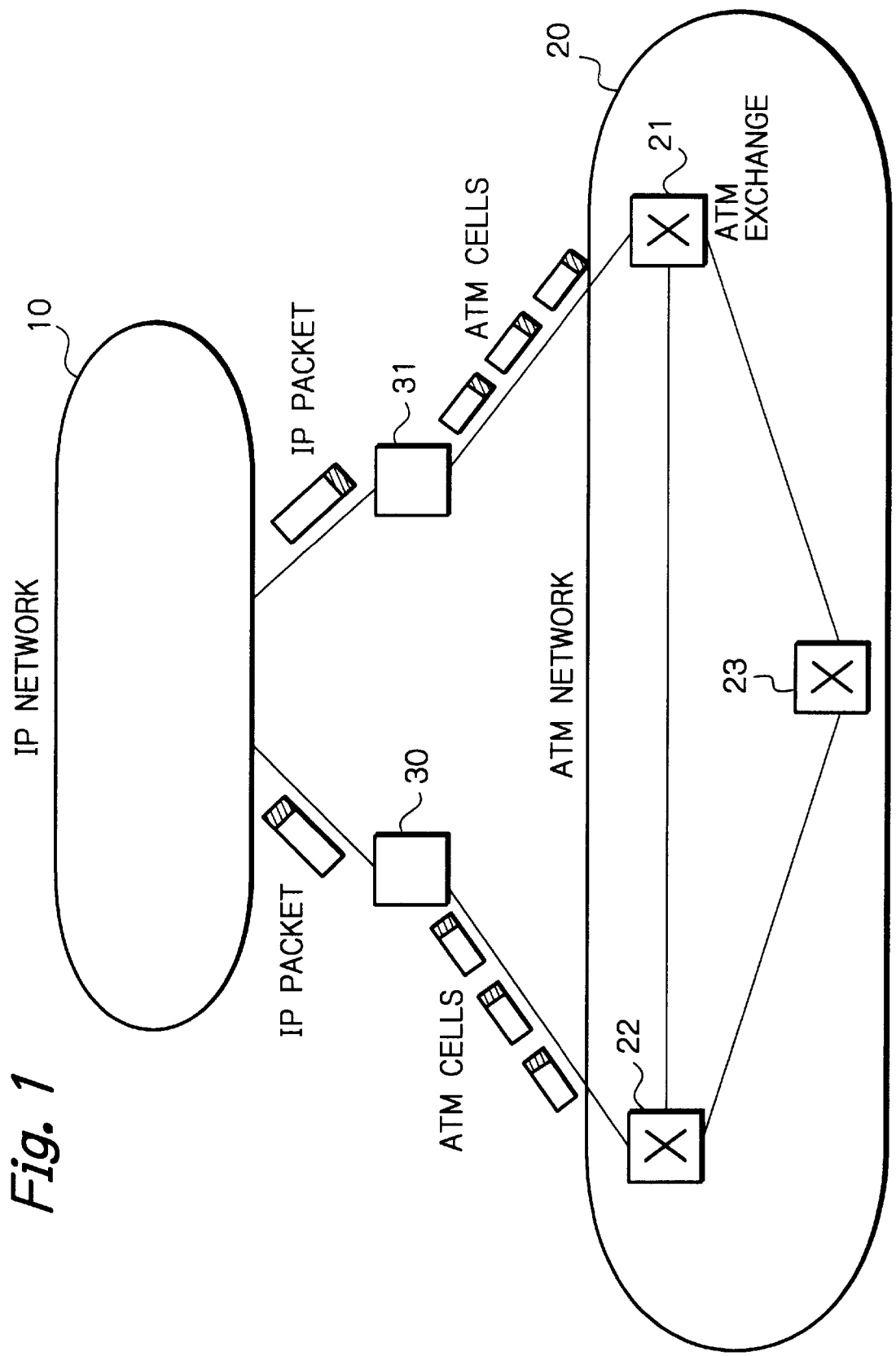
FIG. 1 illustrates a communication system using network interworking devices between an IP network and an ATM network.

As shown in FIG. 1, the communication system has a plurality of network interworking devices 30 and 31 each of which is connected between an IP network 10 and an ATM network 20 including ATM exchanges 21, 22 and 23. Each of the network interworking devices 30 and 31 assembles received ATM cells from the ATM network 20 to form an IP packet to be transferred to the IP network 10, or disassembles received IP packet from the IP network 20 to form ATM cells to be transferred to the ATM network 30.

Figure 2:
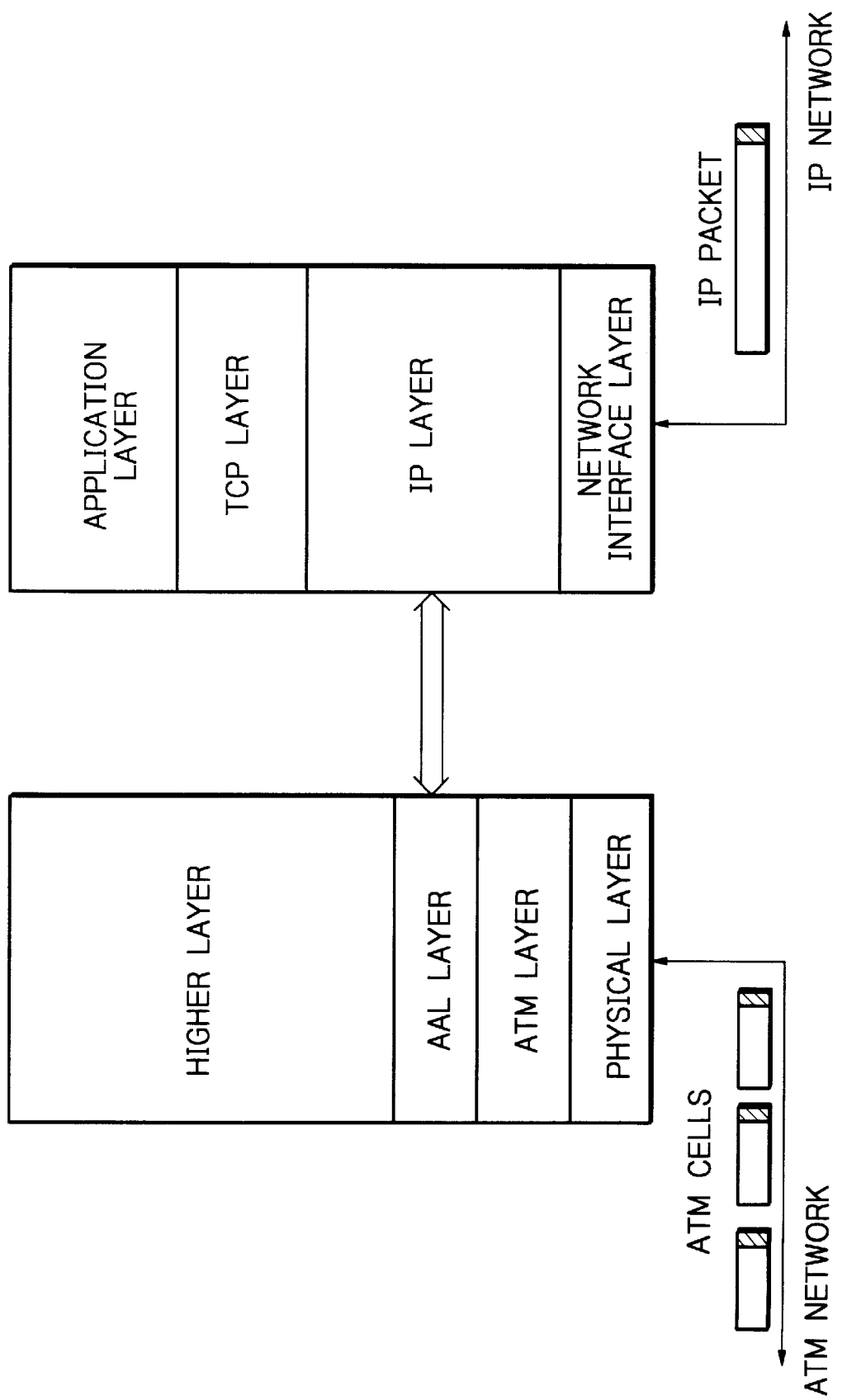
FIG. 2 illustrates the layer structure in the ATM network and the layer structure in the IP network.

As shown in FIG. 2, the layers in ATM network are constituted by a physical layer, an ATM layer, an AAL (ATM Adaptation Layer) layer and an higher layer arranged in this order from the lowest layer, and the layers in IP network are constituted by a network interface layer, an IP layer, an TCP layer and an application layer arranged in this order from the lowest layer.

The network interworking device according to the present invention assembles a plurality of ATM cells in the ALL layer of the ATM network into an IP packet when the plurality of the ATM cells are to be transmitted to the same address in the IP network. The assembled IP packet is transmitted to the IP layer. The interworking device disassembles an IP packet in the IP layer of the IP network into a plurality of ATM cells. The disassembled ATM cells are transmitted to the AAL layer. For example, when audio coding data is transferred, if the audio coding standard is defined equivalently in both networks, the audio data received from the ATM network is transmitted to the IP network without decoding into pulse code modulation data. Since the decoding and coding processes are not executed, the audio quality will not deteriorate at each time the data passes through the network interworking device. Furthermore, the AAL layer in the ATM network is fit to the AAL type-2 which is aimed at audio/animation coded at the variable speed.

Figure 3:
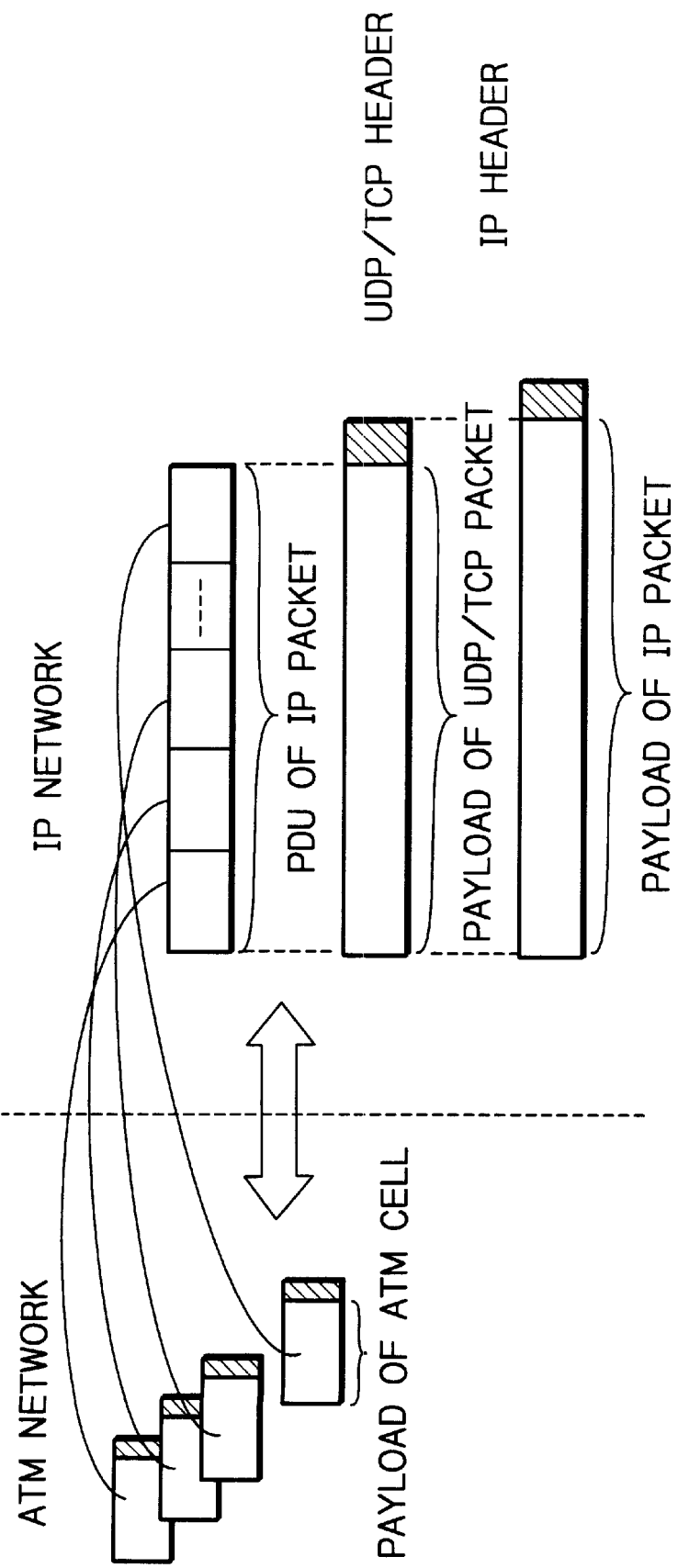
FIG. 3 illustrates data mapping between an IP packet and ATM cells.

As shown in FIG. 3, the network interworking device executes mapping between a plurality of ATM cell payloads and a Protocol Data Unit (PDU) of an IP packet. Each of the cell payloads is formed by removing a header from an ATM standard cell or by removing a short cell header form an ATM short cell.

Figure 4:
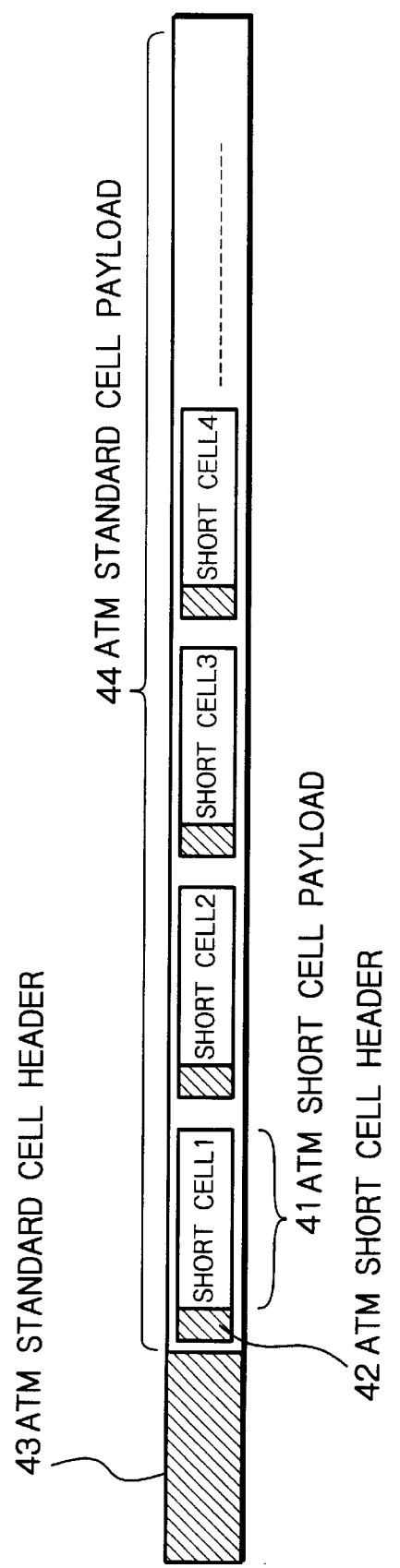
FIG. 4 illustrates configuration of an ATM standard cell and ATM short cells.

The network interworking device according to the present invention can convert not only the ATM standard cells but also the ATM short cells. FIG. 4 illustrates configuration of the ATM standard cell and the ATM short cells. A plurality of the ATM short cells are stored in the ATM standard cell payload 44 of the ATM standard cell with a header 43. Each of the short cells has a short cell header with a channel identifier CID. The ATM cell is associated with the IP packet by using a table which stores correspondences between CIDs and IP addresses.

Figure 5:
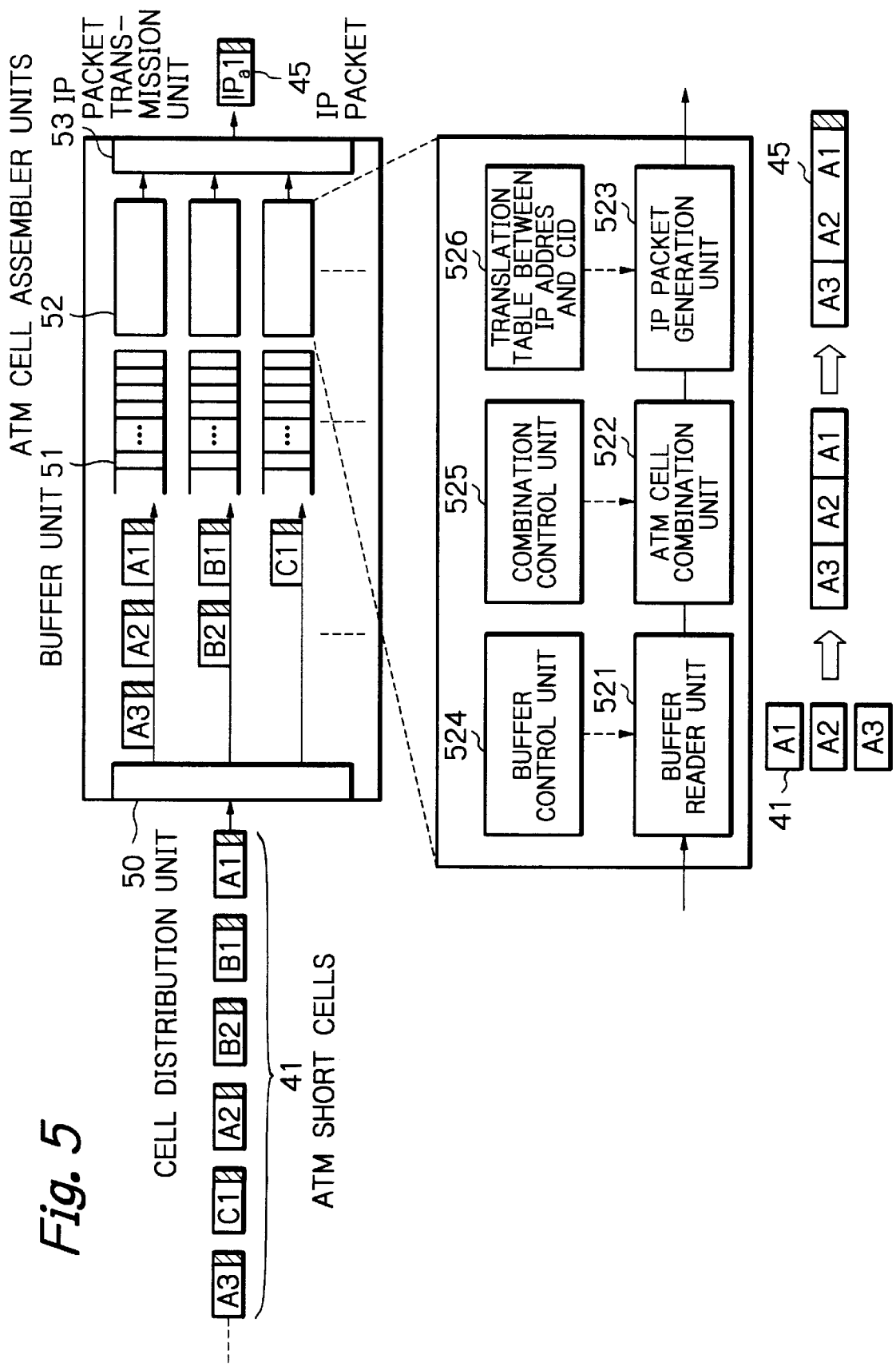
FIG. 5 illustrates a part of a preferred embodiment of the network interworking device according to the present invention.

FIG. 5 illustrates an assembling part of the network interworking devices, in which ATM short cells 41 are assembled into an IP packet 45. The assembling part has a cell distribution unit 50, buffer units for respective calls 51, ATM cell assembler units 52 for the respective calls, and an IP packet transmission unit 53.

The cell distribution unit 50 distributes the received ATM cells into the respective calls. In particular, when receiving ATM short cells, the unit 50 distributes them into the respective channel identifiers CIDs. The buffer unit 51 stores the ATM cells to be assemble temporally. The IP packet transmission unit 53 sends the IP packets generated at the ATM cell assembler units 52 to the IP network.

Each of the ATM cell assembler units 52 has a buffer reader unit 521, a buffer control unit 524, an ATM cell combination unit 522, a combination control unit 525, an IP packet generation unit 523 and a translation table between IP address and CID. IP address information stored in the translation table 526 are obtained from another router (IP packet route control device) in this system. The buffer reader unit 521 in each ATM cell assembler unit reads out ATM cells stored in the buffer unit 51. The ATM cell combination 522 successively combines the read-out ATM cells. The IP packet generation unit 523 generates the IP packet 45 by adding a header to the e composed ed ATM cells.

Figure 6:
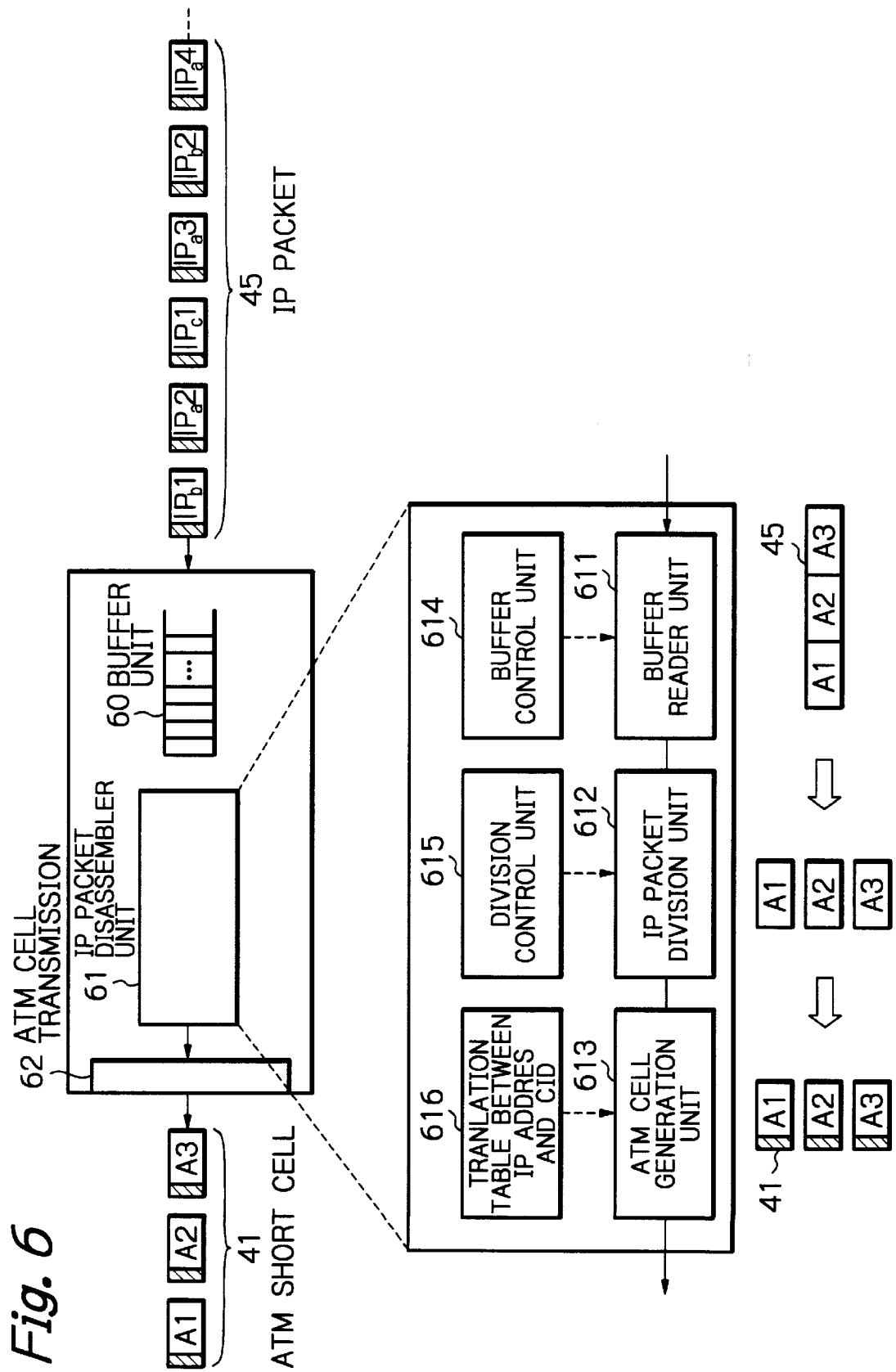
FIG. 6 illustrates another part of the preferred embodiment of the network interworking device.

FIG. 6 illustrates a disassembling part of the network interworking device, in which an IP packet 45 is disassembled into ATM short cells 41. The disassembling part has a buffer unit 60, an IP packet disassembler unit 61 and an ATM cell transmission unit 62. The buffer unit 60 temporally stores the received IP packet to be disassembled. The ATM cell transmission unit 62 transmits the ATM short cells generated the IP packet disassembler unit 62 to the ATM network.

The IP packet disassembler unit 61 has a buffer reader unit 611, a buffer control unit 614, an IP packet division unit 612, a division control unit 615, an ATM cell generation unit 613 and a translation table 616 between an IP address and CID. The buffer reader unit 611 reads out an ATM cells stored in the buffer unit 60. The IP packet division unit 612 successively divides the read-out IP packet. The ATM cell generation unit 613 generates the ATM cell 41 by adding headers to the respective cells divided from the IP packet.

As described above, according to the present invention, the processes of the high layers above the AAL layer in the ATM network and the high layers above the IP layer in the IP network are not necessary, then the processes of the conversion between an IP packet and ATM cells other can be reduced. In particular, for example, in an audio coding device, the coding process in the network interworking device can be possible to omit by using the same coding.

Many widely different embodiments of the present invention may be constructed without departing from the spirit and scope of the present invention. It should be understood that the present invention is not limited to the specific embodiments described in the specification, except as defined in the appended claims.

What is claimed is:

1. A network interworking device for executing conversion between IP packets and ATM cells, said network interworking device being connected between a first communication network in which information is transmitted in a form of the IP packets and a second communication network in which information is transmitted in a form of the ATM cells, said first communication network having a hierarchy structure with an IP layer, said second communication network having a hierarchy structure with an ML layer, said network interworking device comprising:

means for assembling a plurality of ATM cells in the AAL layer of said second communication network into an IP packet when the plurality of ATM cells are to be transmitted to the same address in said first communication network, said assembled IP packet being transmitted to said IP layer; and means for disassembling an IP packet in the IP layer of said first communication network into a plurality of ATM cells, said disassembled ATM cells being transmitted to said AAL layer.

2. The device as claimed in claim 1, wherein each of said ATM cells is an ATM short cell, and wherein an IP address of said IP packet corresponds to a channel identifier CID of said ATM short cell.

3. The device as claimed in claim 1, wherein said AAL layer is an AAL type-2 layer.

4. The device as claimed in claim 1, wherein when audio coding data is transferred, said audio coding data is converted between an IP packet and ATM cells with each other, without converting via a pulse coded modulation.

* * * * *